(12) United States Patent
Seeman et al.

(10) Patent No.: US 7,872,637 B2
(45) Date of Patent: Jan. 18, 2011

(54) SYSTEM AND METHOD FOR TRACKING A LASER SPOT ON A PROJECTED COMPUTER SCREEN IMAGE

(75) Inventors: Lisa Seeman, Los Altos, CA (US); David Dolfi, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 883 days.

(21) Appl. No.: 11/740,251

(22) Filed: Apr. 25, 2007

(65) Prior Publication Data

US 2008/0266253 A1    Oct. 30, 2008

(51) Int. Cl.
*G09G 5/08* (2006.01)
(52) U.S. Cl. .................. 345/158; 345/156; 345/157; 345/166
(58) Field of Classification Search ......... 345/156–169, 345/173–179; 178/18.01–18.09, 19.01–19.07
See application file for complete search history.

(56) References Cited

U.S. PATENT DOCUMENTS

2002/0191029 A1* 12/2002 Gillespie et al. ............ 345/810
2005/0024341 A1* 2/2005 Gillespie et al. ............ 345/173

OTHER PUBLICATIONS

Xinpeng Huang and William Putnam, "Laser Pointer Mouse", 6.111; Introductory Digital Systems Laboratory. May 18, 2006.
Dan R. Olsen Jr. and Travis Nielsen, "Laser pointer interaction", Computer Science Department, Brigham Young University, Provo, UT, CHI Publication, vol. No. 3, Issue No. 1, pp. 17-22, Mar. 31, 2001.
Evgeny Popovich and Zachi Karni, "PresenterMouse LASER-Pointer Tracking System," www.mpi-inf.mpg.de/~karni/presentermouse/report.pdf, 2006 (estimate).
Rahul Sukthankar, Robert G. Stockton and Matthew D. Mullin, "Automatic Keystone Correction for Camera-assisted Presentation Interfaces", appears in: Advances in Multimodal Interfaces—Proceedings of ICMI 2000.

* cited by examiner

*Primary Examiner*—Vijay Shankar (57) ABSTRACT

A system and method for tracking a laser spot on a projected computer screen image computes a projective transformation matrix using the projected computer screen image electronically captured in a frame of image data. The projective transformation matrix is computed by fitting a polygon to a contour of each graphical object in the frame of image data and determining whether the polygon for each graphical object satisfies a set of predefined parameters to find a candidate polygon that corresponds to an outline of the projected computer screen image in the frame of image data.

20 Claims, 5 Drawing Sheets

SYSTEM AND METHOD FOR TRACKING A LASER SPOT ON A PROJECTED COMPUTER SCREEN IMAGE

BACKGROUND OF THE INVENTION

Computer-based presentations are facilitated by a projector connected to a computer to project a computer screen image onto a projection surface, such as a projection screen surface or a wall surface. The projected computer screen image can be the viewable output image of the computer, which is commonly displayed on a computer monitor. Thus, a computer-based presentation may involve displaying what would typically be displayed on a computer monitor. However, the projected computer screen image may be an electronic image that is different than the image displayed on the computer monitor.

In order to point to a specific item in a projected computer screen image during a computer-based presentation, a presenter may use any laser pointer to point to that specific item in the projected computer screen image. The laser pointer is used to create a laser spot on the projection surface, which allows viewers to know what item to which the presenter is pointing. However, a laser pointer typically cannot be used to control the computer-based presentation. Rather, the computer keyboard and/or the computer mouse are usually used to control the computer-based presentation, which anchors the presenter to the computer and limits the mobility of the presenter.

Recently, laser pointer tracking systems have been developed to optically track the laser spot on the projection surface to control the cursor of the computer that is being used to provide the projected computer screen image. The laser pointer used in some of these systems may include buttons or other controls, which emulate computer mouse buttons. Thus, using a laser pointer tracking system, the presenter can freely move about without having to return to the computer to control the computer-based presentation.

A concern with some conventional laser pointer tracking systems is that the systems must be manually calibrated before use. In particular, the position of the projected computer screen image on the projection surface must be manually entered into the system so that the system can determine the location of a laser spot relative to the original computer screen image to move the cursor to that location. Typically, this involves pointing the laser pointer to each corner of the projected computer screen image on the projection surface during a calibration process, which can be annoying to some users.

Thus, there is a need for a laser pointer tracking system, which can automatically perform a calibration process.

SUMMARY OF THE INVENTION

A system and method for tracking a laser spot on a projected computer screen image computes a projective transformation matrix using the projected computer screen image electronically captured in a frame of image data. The projective transformation matrix is computed by fitting a polygon to a contour of each graphical object in the frame of image data and determining whether the polygon for each graphical object satisfies a set of predefined parameters to find a candidate polygon that corresponds to an outline of the projected computer screen image in the frame of image data.

A method for tracking a laser spot on a projected computer screen image in accordance with an embodiment of the invention comprises electronically capturing the projected computer screen image on a projection surface in a frame of image data, fitting a polygon to a contour of each graphical object in the frame of image data, determining whether the polygon for each graphical object satisfies a set of predefined parameters to find a candidate polygon that corresponds to an outline of the projected computer screen in the frame of image data, and computing a projective transformation matrix using corners of the candidate polygon. The projective transformation matrix includes mapping information to track the laser spot on the projected computer screen image.

A laser pointer tracking system in accordance with an embodiment of the invention comprises an image sensor to electronically capture a projected computer screen image on a projection surface in frames of image data, and a laser pointer tracking module operatively coupled to the image sensor. The laser pointer tracking module is configured to fit a polygon to a contour of each graphical object in a particular frame of image data. The laser pointer tracking module is also configured to determine whether the polygon for each graphical object satisfies a set of predefined parameters to find a candidate polygon that corresponds to an outline of the projected computer screen in the particular frame of image data. The laser pointer tracking module is further configured to compute a projective transformation matrix using corners of the candidate polygon. The projective transformation matrix includes mapping information to track the laser spot on the projected computer screen image.

A method for tracking a laser spot on a projected computer screen image in accordance with another embodiment of the invention comprises electronically capturing the projected computer screen image on the projection surface in a color image, converting the color image into a binary image, fitting a polygon to a contour of each graphical object in the binary image, determining whether the polygon for each graphical object satisfies a set of predefined parameters to find a candidate polygon that corresponds to an outline of the projected computer screen in the binary image, and computing a projective transformation matrix using corners of the candidate polygon. The projective transformation matrix includes mapping information to track the laser spot on the projected computer screen image.

Other aspects and advantages of the present invention will become apparent from the following detailed description, taken in conjunction with the accompanying drawings, illustrated by way of example of the principles of the invention.

DETAILED DESCRIPTION

Figure 1:
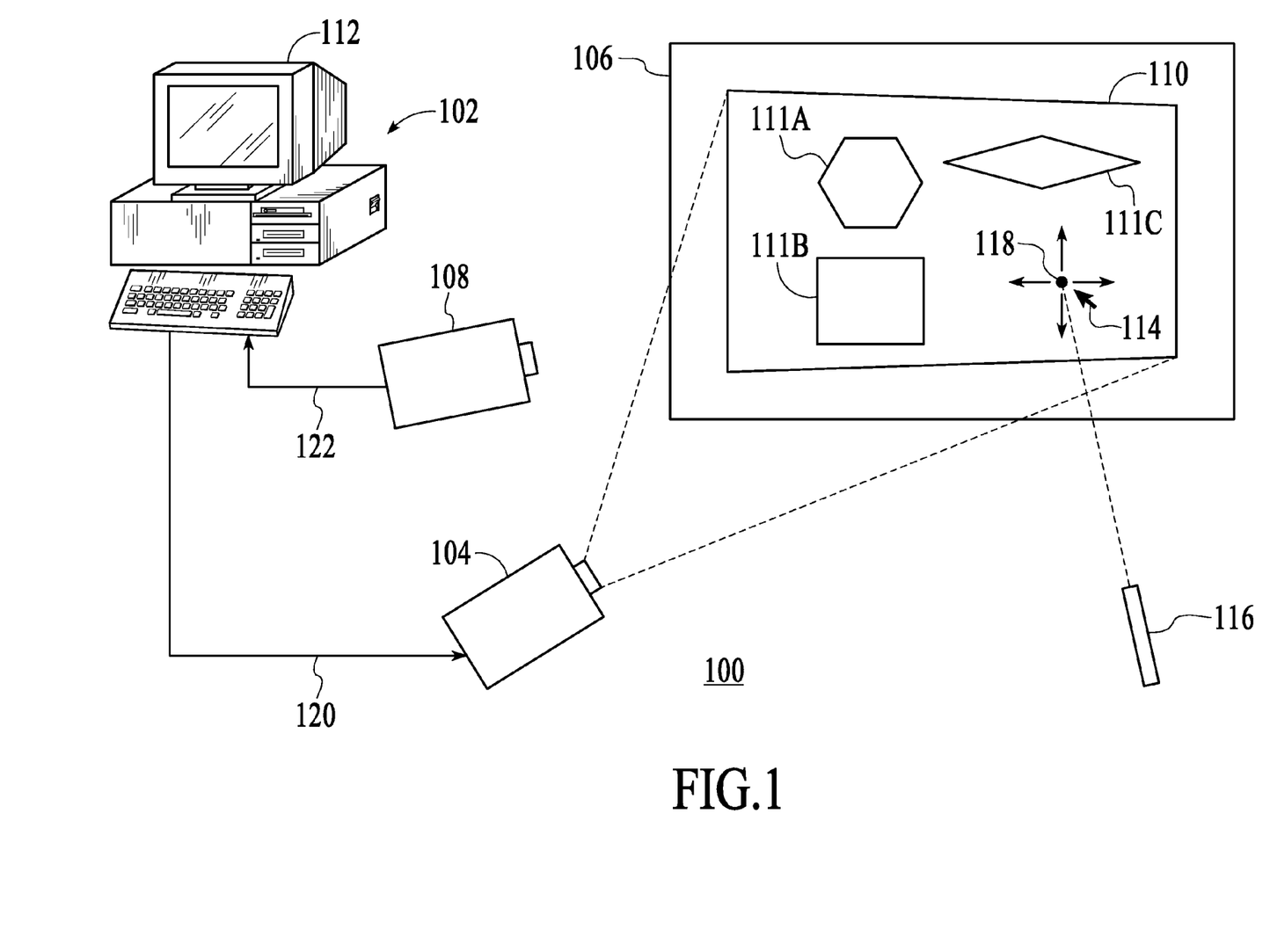
FIG. 1 shows a laser pointer tracking system in accordance with an embodiment of the invention.

With reference to FIG. 1, a laser pointer tracking system 100 in accordance with an embodiment of the invention is described. As shown in FIG. 1, the laser pointer tracking system 100 includes a computer 102, a projector 104, a projection surface 106, and an optical laser pointer tracking unit 108. The laser pointer tracking system 100 operates to project an output image 110 of the computer 102 onto the projection surface 106 using the projector 104. The output image 110 of the computer 102 is the viewable image that is typically displayed on a computer monitor 112 of the computer 102. The output image 110 of the computer 102 is referred to herein as the "computer screen image" of the computer 102 since the output image 110 is equivalent to the image that can be viewed on a computer screen of the computer monitor 112. The laser pointer tracking system 100 also operates to allow a user to control a cursor 114 of the computer 102 using a laser pointer 116, which is used to produce a laser spot 118 on different locations of the projected output image 110 on the projection surface 106. During normal operation, the laser pointer tracking system 100 electronically captures images of the projected computer screen image 110 with the laser spot 118 and determines the position of the laser spot 118 in the captured images. The determined position of the laser spot 118 is then mapped to a corresponding position with respect to the original computer screen image. The laser pointer tracking system 100 then directs the computer 102 to move the cursor 118 to that corresponding position. Thus, a user is able to control the cursor 118 on the projected computer screen image 110 using the laser pointer 116, which can be any ordinary laser pointer that is commercially available.

As described in more detail below, the laser pointer tracking system 100 is designed to perform an automatic calibration process so that the determined position of the laser spot 118 on the projected computer screen image 110 can be properly mapped to the corresponding position relative to the original computer screen image. Thus, the laser pointer tracking system 100 eliminates the need to manually calibrate the system. In addition, during normal operation, the laser pointer tracking system 100 selectively filters out undesired light so that the laser spot 118 produced by the laser pointer 116 can be more reliably detected to determine its position.

The computer 102 of the laser pointer tracking system 100 can be any type of a computer system. As an example, the computer 102 can be any type of a personal computer system, such as a desktop personal computer or a laptop personal computer. The computer 102 may be installed with software such as a presentation application so that an electronic presentation can be displayed on the projection screen 106 using the projector 104. The projector 104 can be any type of a computer projector that can project the computer screen image of a connected computer. The projector 104 is connected to the computer 102 via a connection 120, which can be a wired or wireless connection. The projector 104 operates to receive a computer screen image from the computer 102 in the form of output signals, which are processed to project the computer screen image onto the projection surface 106. The projection surface 106 can be any surface that can be used to display the projected computer screen image 110. As an example, the projection surface 106 can be the viewable surface of a projection screen. As another example, the projection surface 106 can be a surface of a wall.

The laser pointer tracking unit 108 is also connected to the computer 102 via a connection 122, which can be a wired or wireless connection. The laser pointer tracking unit 108 operates to electronically capture images of the projected computer screen image 110 on the projection surface 106 as frames of image data to identify the laser spot 118 produced by the laser pointer 116 in the captured frames of image data. Once the laser spot 118 is detected in a captured image frame, the position of the laser spot 118 in the captured frame can be determined and then translated or mapped to a corresponding position relative to the original computer screen image. The mapped position of the laser spot 118 can then be used to move the cursor 118 to that position. In some embodiments, the laser pointer tracking unit 108 also performs an automatic calibration process.

Figure 2:
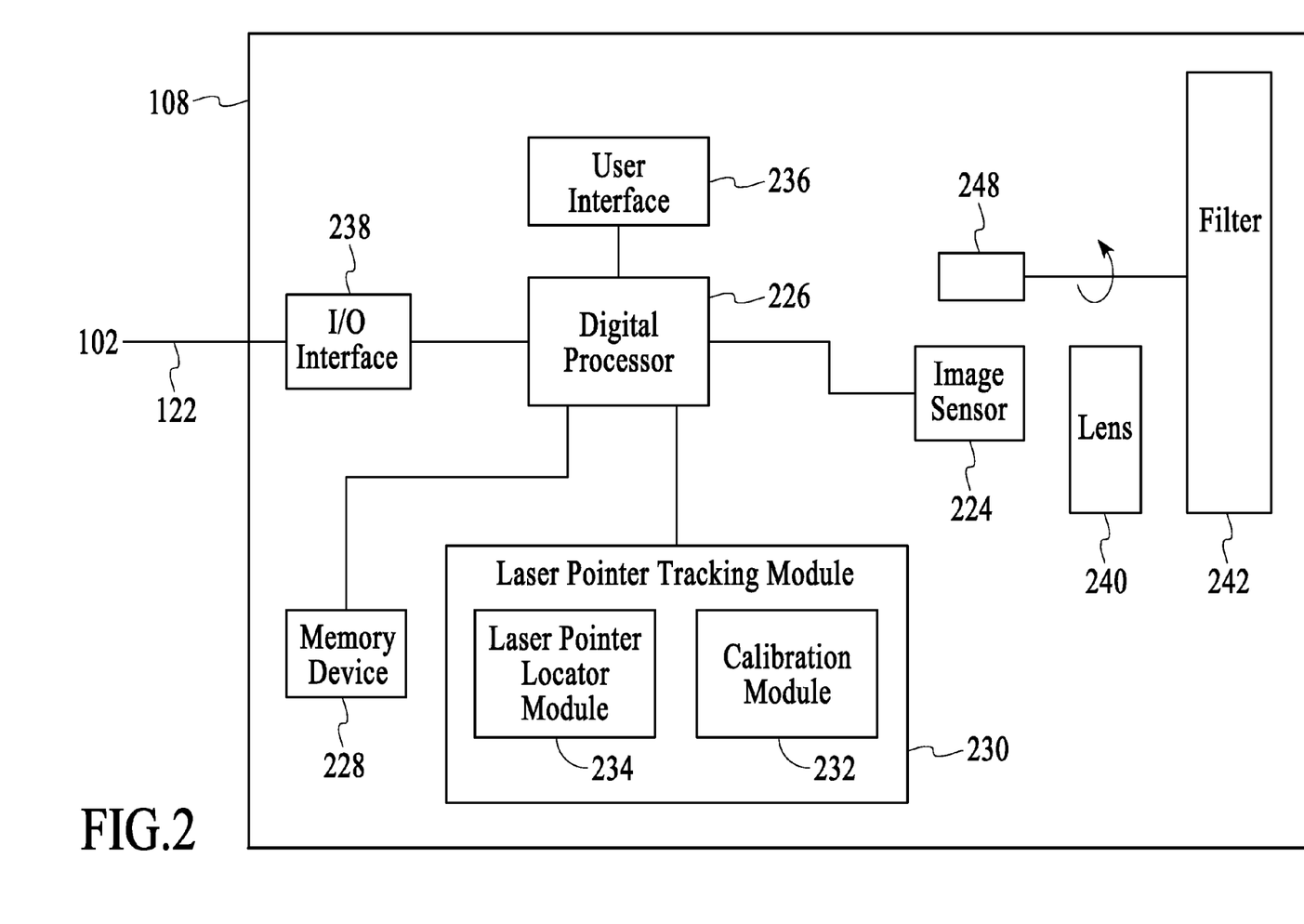
FIG. 2 is a block diagram of a laser pointer tracking unit of the laser pointer tracking system of FIG. 1 in accordance with an embodiment of the invention.

Turning now to FIG. 2, the components of the laser pointer tracking unit 108 in accordance with an embodiment of the invention are shown. The laser pointer tracking unit 108 includes an image sensor 224, a digital processor 226, a memory device 228, a laser pointer tracking module 230 with a calibration module 232 and a laser pointer locator module 234, a user interface 236 and an input/output (I/O) interface 238. The image sensor 224, the memory device 228, the laser pointer tracking module 230, the user interface 236 and the I/O interface 238 are all connected to the digital processor 226. Although the laser pointer tracking unit 108 is shown to include certain components, the laser pointer tracking unit 108 may include additional components in other embodiments. For example, if the laser pointer tracking unit 108 utilizes a wireless connection to connect to the computer 102, the laser pointer tracking unit 108 may include a radio frequency (RF) transmitter and/or a RF receiver to transmit and/or to receive RF signals.

In some embodiments, the digital processor 226 may be a general-purpose processor such as a microprocessor or microcontroller. In other embodiments, the digital processor 226 may be a special-purpose processor such as a digital signal processor. In other embodiments, the digital processor 226 may be another type of processor or a field programmable gate array (FPGA). In general, the digital processor 226 implements operations and functions of the laser pointer tracking unit 108.

The memory device 228 is configured to store data and/or instructions for use in the operation of the laser pointer tracking unit 108. In some embodiments, the memory device 28 stores instructions, which when executed by the digital processor 226, cause the digital processor to perform certain operations. In other embodiments, some or all of the data and/or instructions may be stored in memory (not shown) integrated into the digital processor 226.

The I/O interface 238 allows the laser pointer tracking unit 108 to transmit signals, such as signals related to the relative position of a detected laser spot, to the computer 102 via the connection 122. The I/O interface 238 also allows the laser pointer tracking unit 108 to receive control signals and/or feedback signals from the computer 102. In some embodiments, the I/O interface 238 may include one or more ports to connect one or more wires to the I/O interface 238 to establish the connection 122 between the laser pointer tracking unit 108 and the computer 102.

The user interface 236 allows a user to input commands into the laser pointer tracking unit 108. The user interface 236 includes one or more controls (not shown) for a user to input the desired commands. As an example, the user interface 236 may includes one or more buttons, dials and/or switches. One of the controls of the user interface 236 may be a calibration activation control to direct the laser pointer tracking unit 236 to perform an automation calibration process. The user interface 236 may also include a display device (not shown) to display options and/or entered commands.

The image sensor 224 is configured to electronically capture frames of image data. The image sensor 224 is used to electronically capture the projected computer screen image 110 on the projection surface 106. The image sensor 224 includes an electronic imaging sensor array, such as a complimentary metal-oxide-semiconductor (CMOS) image sensor array or a charge-coupled device (CCD) image sensor array. For example, the image sensor 224 may include a 320×240 pixel array to capture frames of image data with corresponding number of pixels. However, other embodiments of the image sensor 224 may include a smaller or larger pixel array to capture frames of image data with lower or higher resolution. In an embodiment, the image sensor 224 is a color image sensor that captures color frames of image data or color images.

In some embodiments, the laser pointer tracking unit 108 includes an optical lens 240 and an optical bandpass filter 242, as depicted in FIG. 2. The optical lens 240 and the optical bandpass filter 242 are positioned in front of the image sensor 224 to optically manipulate incoming light. The optical lens 240 is used to focus an image onto the image sensor 224. In the illustrated embodiment, the laser pointer tracking unit 108 includes a single optical lens, i.e. the optical lens 240. However, in other embodiments, the laser pointer tracking unit 108 may include multiple optical lenses, or may not include any optical lens. The optical bandpass filter 242 is used to selectively transmit light having wavelengths within a particular wavelength range and to block light having wavelength not within the particular wavelength range. The particular wavelength range of the optical bandpass filter 242 can be selected to correspond to the wavelength spectrum of light emitted by the laser pointer 116 so that the laser spot 118 produced by the laser pointer can be more readily detected in frames of image data captured by the image sensor 224. The optical bandpass filter 242 can be any type of an optical bandpass filter. As an example, the optical bandpass filter 242 may be a narrow bandpass interference filter with center frequency of 650 nm with a 10 nm full width at half maximum (FWHM). In this example, the optical bandpass filter will transmit light from a laser pointer that creates laser light having a center (peak) frequency of approximately 650 nm and serve to block most of the undesired light, i.e., light not from the laser pointer. In some embodiments, the optical bandpass filter 108 may be a filter that is configured to have varying center frequencies to transmit laser light of different colors. The optical bandpass filter 242 is an optional component of the laser pointer tracking unit 108, and thus, can be omitted from the laser pointer tracking unit 108.

Figure 3:
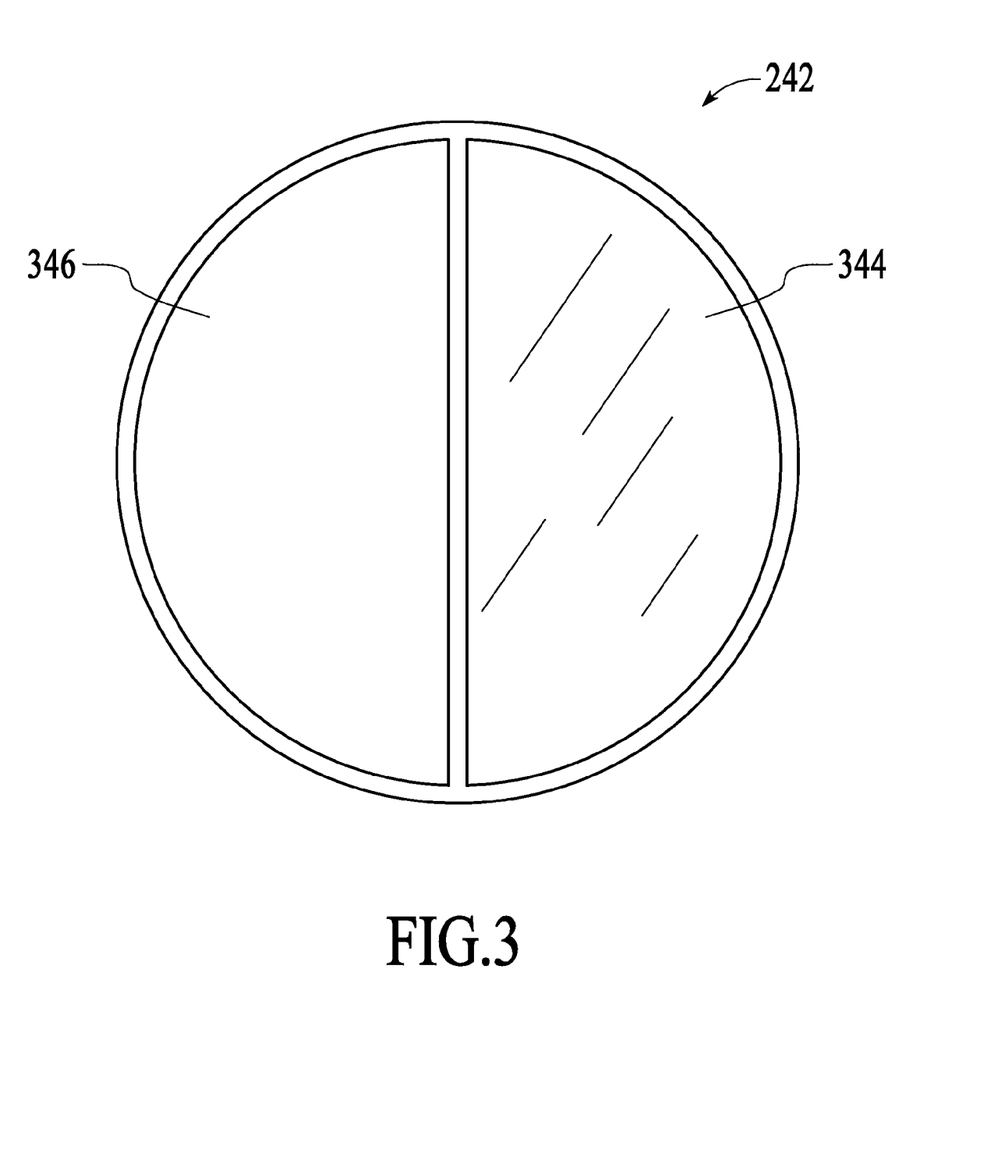
FIG. 3 is a front view of an optical bandpass filter included in the laser pointer tracking unit of FIG. 2 in accordance with an embodiment of the invention.

In an embodiment, as illustrated in FIG. 3, the optical bandpass filter 242 is configured to be optically active or optically inactive. That is, the optical bandpass filter 242 can be switched between one of two modes, the optically active and the optically inactive. When switched to the optically active mode, the optical bandpass filter 242 functions to filter incoming light. When switched to the optically inactive mode, the optical bandpass filter 242 does not filter any light. The optically active mode is used during normal operation to detect and track the movements of a laser spot in captured frames of image data. The optically inactive mode is used during an automatic calibration process to detect and determine the position of a projected computer screen image in a captured frame of image data.

In the embodiment shown in FIG. 3, the optical bandpass filter 242 includes an active region 344 and an inactive region 346. The active region 344 is made of optical bandpass filtering material to selective transmit received light based on wavelength. The inactive region 346 is made of optically transparent material without any optical manipulating properties. As an example, the inactive region 346 may be a thin layer of clear plastic or glass material. Alternatively, the inactive region 346 may be an open area. In FIG. 3, each of the active and inactive regions 344 and 346 of the optical band-pass filter 242 is configured in a semicircular shape. However, in other embodiments, the active and inactive regions 344 and 346 may be configured in other geometrical shapes.

As illustrated in FIG. 2, the optical bandpass filter 242 is connected to a rotating mechanism 248, such as a motor, to rotate the optical bandpass filter. Furthermore, the optical bandpass filter 242 is positioned relative to the image sensor 224 such that one of the regions 344 and 346 of the optical bandpass filter can be positioned directly in front of the image sensor 224 by rotating the optical bandpass filter. In the optically active mode, the optical bandpass filter 242 is rotated by the rotating mechanism 248 so that the active region 244 of the optical bandpass filter is positioned in front of the image sensor 224 when the image sensor is sampling the received light to capture a frame of image data. In the optically inactive mode, the optical bandpass filter 242 is rotated by the rotating mechanism 248 so that the inactive region 346 of the optical bandpass filter is positioned in front of the image sensor when the image sensor is sampling the received light to capture a frame of image data. In some embodiments, the optical bandpass filter 242 is continuously rotated such that the rotation of the optical bandpass filter is timed with the frame rate of the image sensor 224 to set the optical bandpass filter to either the optically active mode or the optically inactive mode, allowing for periodic screen recalibration.

The laser pointer tracking module 230 operates to process the captured image frames to perform a laser pointer tracking operation or to perform an automatic calibration process. The laser tracking module 230 includes the calibration module 232 and the laser pointer locator module 234. The laser pointer locator module 234 is configured to identify an imaged laser spot in frames of image data captured by the image sensor 234 and to determine the position of the identified laser spot during normal laser pointer tracking operation. The laser pointer locator module 234 searches for a small bright region in a captured frame of image data to locate the imaged laser spot in the captured image frame. In an embodiment, pixel or luminance values of the image frame is blurred and compared to a threshold value to find bright pixels, which may be pixels that belong to the imaged laser spot. Blurring is the process of averaging a value of a pixel with values of neighboring pixels. Using these bright pixels, contours or boundaries of clusters made of these bright pixels are located. The located contours are then analyzed using predefined parameters to determine which one of the clusters is the imaged laser spot in the image frame. As an example, long thin clusters of bright pixels may not be considered to be candidates for the imaged laser spot, and thus, are discarded. As another example, clusters smaller or larger than a predefined size may not be considered to be candidates for the imaged laser spot, and thus, are discarded. Once the laser spot cluster is found, the center position of the laser spot cluster in the frame of image data is computed. This computed position of the laser spot cluster is a position relative to the frame of image data. The computed position of the laser spot cluster is then mapped or transformed to a corresponding position relative to the original computer screen image using a projective transformation matrix, which is computed by the calibration module 232. In an embodiment, the projective transformation matrix is configured to transform a coordinate within a captured frame of image data to a corresponding coordinate within the original computer screen image.

The use of the optical bandpass filter 242 allows the laser pointer locator module 234 to perform its functions more effectively and efficiently. Since the optical bandpass filter 242 blocks out undesired light, i.e., light that cannot be from a laser pointer, the laser pointer locator module 234 has fewer bright pixels in captured frames of image data to process and analyze to identify the laser spot in the captured frames and to determine its position.

The calibration module 232 is configured to perform an automatic calibration process to calibrate the laser pointer tracking system 100 to produce the projective transformation matrix. The calibration module 232 may be configured to perform an automatic calibration process when the laser pointer tracking unit 108 is first activated. The calibration module 232 may also be configured to perform an automatic calibration process in response to a user input, e.g., pressing of an appropriate button of the user interface 236. The calibration module 232 may also be configured to perform an automatic calibration process periodically without user input, e.g., every half an hour.

In general, during an automatic calibration process, the calibration module 232 operates to locate the projected computer screen image in a frame of image data captured by the image sensor 224 to determine the locations of its corners. These corner locations are then used to compute the projective transformation matrix, which is used by the laser pointer locator module 234 as described above. The automatic calibration process is described in more detail below.

In an embodiment, the calibration module 232 and the laser pointer locator module 234 are implemented as software stored in the memory device 228 and executed by the digital processor 226. In other embodiments, the calibration module 232 and/or the laser pointer locator module 234 may be implemented in any combination of software, hardware and/or firmware. Still in other embodiments, the calibration module 232 and/or the laser pointer locator module 234 may be implemented in an external hardware, such as a Field-Programmable Gate Array (FPGA). Although the calibration module 232 and the laser pointer locator module 234 are illustrated as being separate individual components, in other embodiments, the calibration module 232 and/or the laser pointer locator module 234 may be partially or wholly integrated with the digital processor 226. Still in other embodiments, the calibration module 232 and/or the laser pointer locator module 234 may be partially or wholly incorporated into the computer 102.

Figure 4:
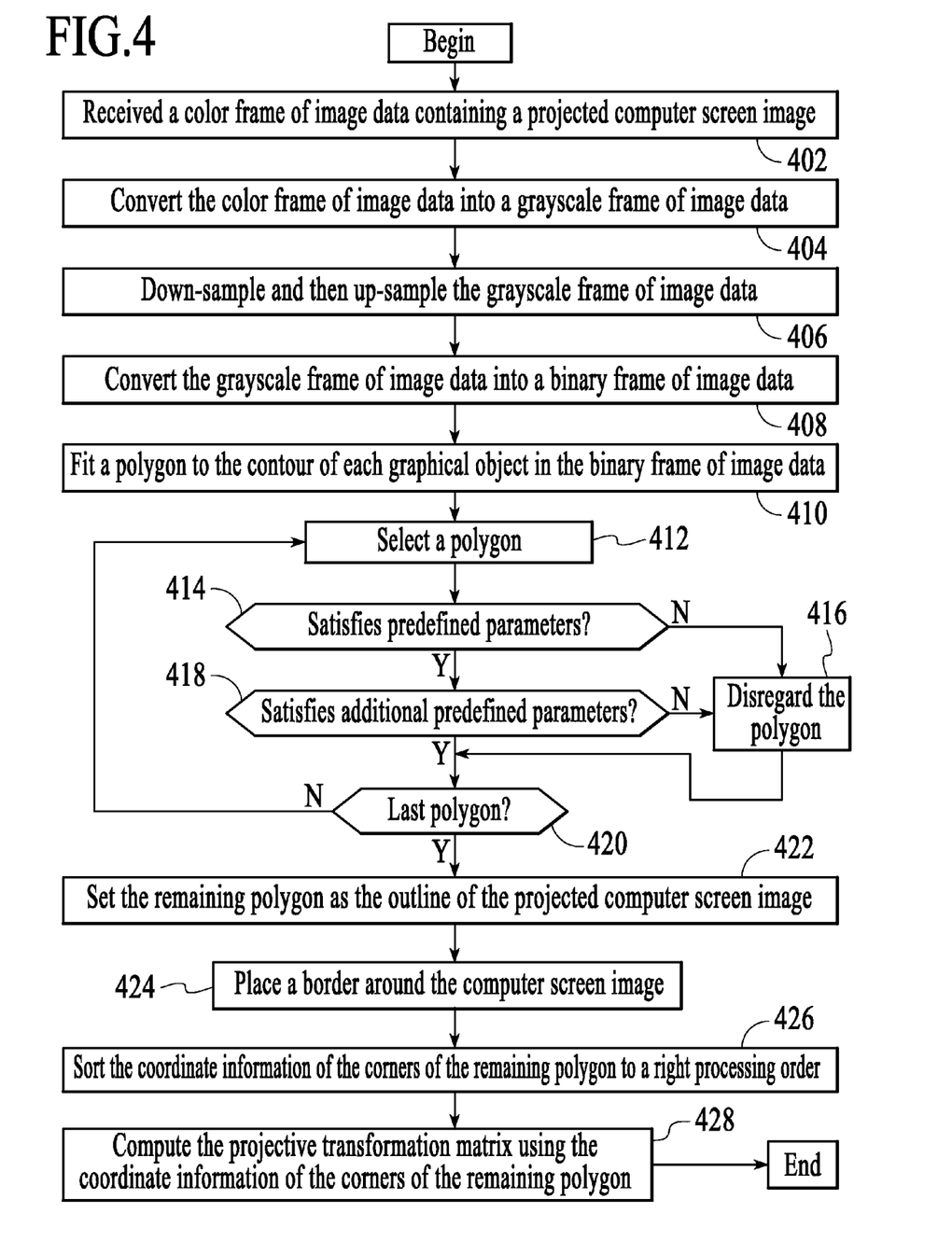
FIG. 4 is a process flow diagram of an automatic calibration process performed by a calibration module of the laser pointer tracking unit in accordance with an embodiment of the invention.

The automatic calibration process performed by the calibration module 232 in accordance with an embodiment of the invention is described with reference to a process flow diagram of FIG. 4. At block 402, a color frame of image data containing a projected computer screen image is received. The color frame of image data is captured by the image sensor 224 with the optical bandpass filter 242 set to the optically inactive mode. Next, at block 404, the color frame of image data is converted into a grayscale frame of image data. Next, at block 406, the grayscale frame of image data is downsampled and then up-sampled to reduce noise. Next, at block 408, the grayscale frame of image data is converted into a binary frame of image data, e.g., using a threshold. A binary image is an image with each pixel set to one of two values, e.g., 0 and 255. Blocks 404-408 may be performed as part of a preprocessing operation.

Next, at block 410, a polygon is fitted to the contour of each graphical object in the binary image frame to approximate the contour of that graphical object. A graphical object defines a closed region of pixels, which determines the boundaries of the polygon. Fitting a polygon to the contour of each graphical object involves matching polygons with various numbers of sides to the closed region of that graphical object. One of the graphical objects in the binary image frame is a projected computer screen image, e.g., the projected computer screen image 110 shown in FIG. 1. The other graphical objects in the binary image frame may be graphical objects in the projected computer screen image, e.g., graphical objects 111A, 111B and 111C in the projected computer screen image 110 shown in FIG. 1.

Next, at block 412, a polygon for a particular graphical object in the binary image frame is selected to be analyzed. Next, at block 414, a determination is made whether the selected polygon for the particular graphical object in the binary image frame satisfies predefined parameters to see if that particular graphical object is the projected computer screen image. At this block, the polygon or the particular graphical object is checked to see if the polygon is a sufficiently rectangular in shape since the contour of the projected computer screen image in the binary image frame is expected to be somewhat rectangular in shape. The predefined parameters include parameters with respect to:

1) number of vertices;
2) angles between adjacent sides; and
3) convexity.

For the first predefined parameter, a determination is made whether the number of vertices of the selected polygon equals four (4), which means that the polygon is a quadrilateral. As an illustration, a polygon fitted to the graphical object 111A shown in FIG. 1 would not satisfy this predefined parameter since that polygon would have six (6) vertices. For the second parameter, a determination is made whether the angles between adjacent sides of the selected polygon are approximately ninety (90) degrees. Any range about ninety (90) degrees may be used for this determination. As an example, the angels between adjacent sides of the selected polygon are check to see if they are between eighty (80) degrees and one hundred (100) degrees, which is within the range of morphing from viewing at a rectangle from a reasonable angle. As an illustration, a polygon fitted to the graphical object 111C shown in FIG. 1 would not satisfy this predefined parameter since that the angle between adjacent sides of that polygon would not be between eighty (80) degrees and one hundred (100) degrees. For the third parameter, a determination is made whether the convexity of the selected polygon is similar to that of a rectangle. The third parameter is used to make sure that the contour of the graphical object is simple and does not self-intersect, i.e., its sides do not cross each other (for example, a bowtie shape). As an illustration, a polygon fitted to the graphical object 111A shown in FIG. 1 would not satisfy this predefined parameter since that the convexity of that polygon would not be similar to the convexity of a rectangle.

If the selected polygon does not satisfy the predefined parameters, then the process proceeds to block 416, where the particular graphical object of the selected polygon is disregarded, i.e., the selected polygon is not considered to be the projected computer screen image. If the selected polygon does satisfy the predefined characteristics, then the process proceeds to block 418.

At block 418, a determination is made whether the selected polygon for the particular graphical object in the binary image frame satisfies additional predefined parameters to see if the particular graphical object is the projected computer screen image.

The additional predefined characteristics include characteristics with respect to:

1) area; and
2) aspect ratio.

For the first additional predefined parameter, a determination is made whether the area of the selected polygon is of sufficient size to be the outline of the projected computer screen image. That is, the area of the selected polygon should be sufficiently large but smaller than the entire binary image frame. As an example, the area of the selected polygon is checked to see if it is larger than fifty (50) percent of the binary image frame but smaller than ninety-five (95) percent of the binary image frame. However, other percentage ranges may instead be used. As an illustration, a polygon fitted to the graphical object 111B shown in FIG. 1 would not satisfy this predefined parameter since that the area of that polygon would be too small. For the second additional predefined parameter, a determination is made whether the aspect ratio of the selected polygon is similar to the aspect ratio of the original computer screen image. As an example, the aspect ratio of the selected polygon is checked to see if it substantially equals 3:4 or 6:9. As used herein, the term "substantially" means approximately with a small margin of difference, which can be up to ten (10) percent. The aspect ratio that is used as a comparison ratio for the selected polygon may be set to a particular aspect ratio manually by the user or automatically by the laser pointer tracking unit based on the aspect ratio setting of the computer. As an illustration, a polygon fitted to the graphical object 111B shown in FIG. 1 would not satisfy this predefined parameter since that the aspect ratio of that polygon would not be 3:4 or 6:9.

If the selected polygon does not satisfy the additional predefined parameters, then the process proceeds to block 416, where the particular graphical object of the selected polygon is disregarded. If the selected polygon does satisfy the additional predefined characteristics, then the process proceeds to block 420.

At block 420, a determination is made whether the selected polygon is the last polygon for the binary image frame. If no, then the process proceeds back to block 412, where the next polygon for another graphical object in the binary image frame is selected. If yes, then the process proceeds to block 422.

At block 422, the remaining polygon is set as the outline of the projected computer screen image in the captured image frame. If there are more than one remaining polygon, then the last polygon that satisfies all the predefined parameter may be used. Next, at optional block 424, a border is placed around the projected computer screen image in the binary image frame or the original color image frame and the resulting image is projected onto the projection surface 106 via the computer 102 and the projector 104 for visualization. In an embodiment, the border is equivalent to the sides of the selected polygon. As an example, a green border may be placed around the projected computer screen image in the binary image frame or the original color image frame.

Next, at block 426, the coordinate information of the corners of the remaining polygon is sorted to a predefined processing order. Next, at block 428, the coordinate information of the corners of the remaining polygon is used to compute the projective transformation matrix. As described above, the projective transformation matrix is used during normal laser tracking operation to determine the relative position of an imaged laser spot with respect to the original computer screen image. The process then comes to an end.

In other embodiments, the above-described automatic calibration process may be modified. In some embodiments, one or more processing blocks of the automatic calibration process may be omitted. In some embodiments, one or more processing blocks of the automatic calibration process may be divided and performed serially. In some embodiments, two or more processing blocks of the automatic calibration process may be combined and performed in parallel.

Figure 5:
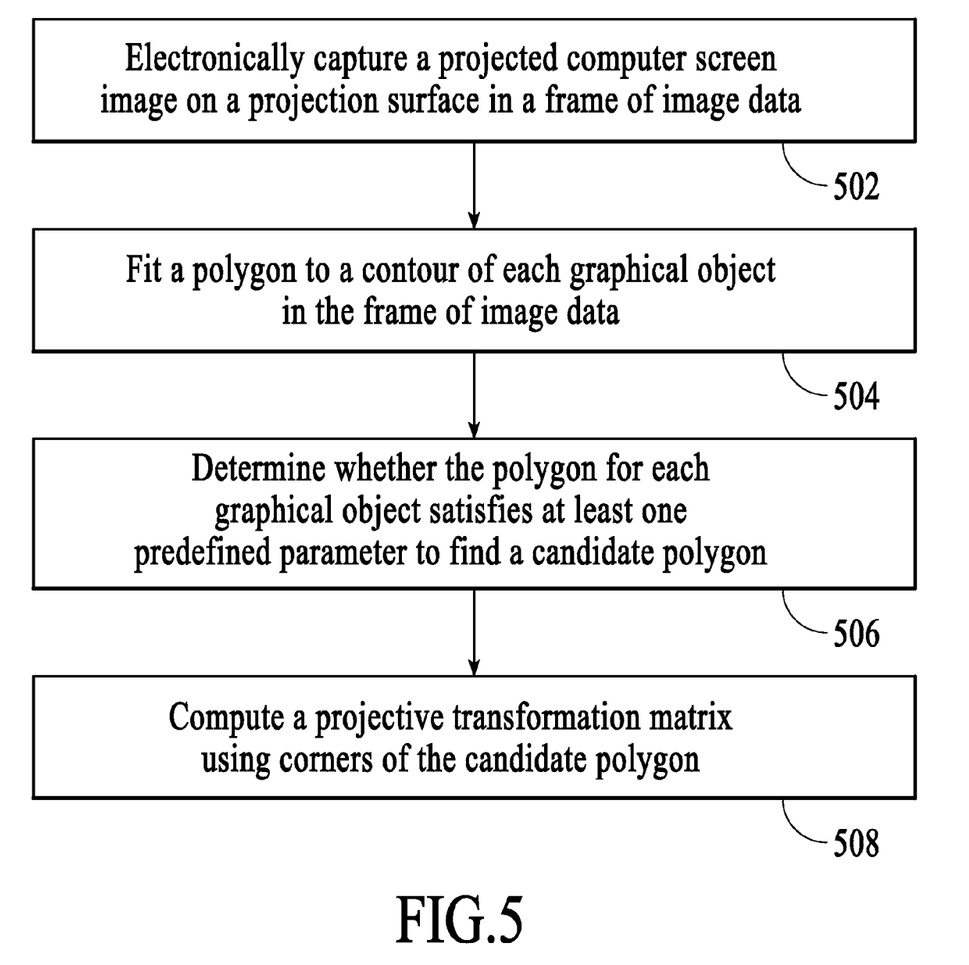
FIG. 5 is a process flow diagram of a method for tracking a laser spot on a projected computer screen image in accordance with an embodiment of the invention.

A method for tracking a laser spot on a projected computer screen image in accordance with an embodiment of the invention is described with reference to a process flow diagram of FIG. 5. At block 502, the projected computer screen image on a projection surface is electronically captured in a frame of image data. Next, at block 504, a polygon is fitted to a contour of each graphical object in the frame of image data. Next, at block 506, a determination is made whether the polygon for each graphical object satisfies a set of predefined parameters to find a candidate polygon that corresponds to an outline of the projected computer screen in the frame of image data. Next, at block 508, a projective transformation matrix is computed using corners of the candidate polygon. The projective transformation matrix includes mapping information to track the laser spot on the projected computer screen image.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for tracking a laser spot on a projected computer screen image, said method comprising:
   electronically capturing said projected computer screen image on a projection surface in a frame of image data;
   fitting a polygon to a contour of each graphical object in said frame of image data;
   determining whether said polygon for each graphical object satisfies a set of predefined parameters to find a candidate polygon that corresponds to an outline of said projected computer screen in said frame of image data; and
   computing a projective transformation matrix using corners of said candidate polygon, said projective transformation matrix including mapping information to track said laser spot on said projected computer screen image.

2. The method of claim 1 wherein said determining includes determining whether said polygon for each graphical object satisfies a predefined parameter with respect to one of number of vertices, angles between adjacent sides, and convexity.

3. The method of claim 2 wherein said determining whether said polygon for each graphical object satisfies said set of predefined parameters includes determining whether the number of vertices of said polygon for each graphical object equals four.

4. The method of claim 2 wherein said determining whether said polygon for each graphical object satisfies said set of predefined parameters includes determining whether angles of adjacent sides of said polygon for each graphical object are approximately between eighty degrees and one hundred degrees.

5. The method of claim 1 wherein said determining includes determining whether said polygon for each graphical object satisfies a predefined parameter with respect to one of area and aspect ratio.

6. The method of claim 5 wherein said determining whether said polygon for each graphical object satisfies said set of predefined parameters includes determining whether the area of said polygon for each graphical object is approximately between fifty percent and nine-five percent of the size of said frame of image data.

7. The method of claim 5 wherein said determining whether said polygon for each graphical object satisfies said set of predefined parameters includes determining whether the aspect ratio of said polygon for each graphical object is approximately one of 3:4 and 6:9.

8. The method of claim 1 further comprising converting said frame of image data from a color image frame into a binary image frame.

9. The method of claim 8 wherein said converting includes:
converting said frame of image data from said color image frame into a grayscale image frame;
down-sampling and then up-sampling said grayscale image frame; and
converting said grayscale image frame into said binary image frame.

10. The method of claim 1 further comprising:
filtering incoming light based on wavelength, including transmitting said incoming light within a selected wavelength range and filtering out said incoming light not within said selected wavelength range;
electronically capturing at least a portion of said projection surface in another frame of image data using said incoming light; and
processing said another frame of image data to track said laser spot in said another frame of image data using said projective transformation matrix computing position.

11. A laser pointer tracking system comprising:
an image sensor to electronically capture a projected computer screen image on a projection surface in frames of image data; and
a laser pointer tracking module operatively coupled to said image sensor, said laser pointer tracking module being configured to fit a polygon to a contour of each graphical object in a particular frame of image data, said laser pointer tracking module being also configured to determine whether said polygon for each graphical object satisfies a set of predefined parameters to find a candidate polygon that corresponds to an outline of said projected computer screen in said particular frame of image data, said laser pointer tracking module being further configured to compute a projective transformation matrix using corners of said candidate polygon, said projective transformation matrix including mapping information to track a laser spot on said projected computer screen image.

12. The system of claim 11 wherein said laser pointer tracking module is configured to determine whether said polygon for each graphical object satisfies a predefined parameter with respect to one of number of vertices, angles between adjacent sides, and convexity.

13. The system of claim 11 wherein said laser pointer tracking module is configured to determine whether said polygon for each graphical object satisfies a predefined parameter with respect to one of area and aspect ratio.

14. The system of claim 11 wherein said laser pointer tracking module is configured to convert said frame of image data from a color image frame into a binary image frame.

15. The system of claim 14 wherein said laser pointer tracking module is configured to convert said frame of image data from said color image frame into a grayscale image frame, down-sample and then up-sample said grayscale image frame, and convert said grayscale image frame into said binary image frame.

16. The system of claim 11 further comprising an optical bandpass filter optically coupled to said image sensor, said optical bandpass filter being configured to transmit light within a selected wavelength range that corresponds to a wavelength range of a particular laser light.

17. A method for tracking a laser spot on a projected computer screen image, the method comprising:
electronically capturing said projected computer screen image on said projection surface in a color image;
converting said color image into a binary image;
fitting a polygon to a contour of each graphical object in said binary image;
determining whether said polygon for each graphical object satisfies a set of predefined parameters to find a candidate polygon that corresponds to an outline of said projected computer screen in said binary image; and
computing a projective transformation matrix using corners of said candidate polygon, said projective transformation matrix including mapping information to track said laser spot on said projected computer screen image.

18. The method of claim 17 wherein said determining includes determining whether said polygon for each graphical object satisfies a predefined parameter with respect to one of number of vertices, angles between adjacent sides, and convexity.

19. The method of claim 17 wherein said determining includes determining whether said polygon for each graphical object satisfies a predefined parameter with respect to one of area and aspect ratio.

20. The method of claim 17 wherein said converting includes:
converting said color image into a grayscale image;
down-sampling and then up-sampling said grayscale image; and
converting said grayscale image into said binary image.

* * * * *